(12) United States Patent
Marshall et al.

(10) Patent No.: US 9,411,461 B2
(45) Date of Patent: Aug. 9, 2016

(54) MOVEABLE INTERACTIVE SHORTCUT TOOLBAR AND UNINTENTIONAL HIT REJECTER FOR TOUCH INPUT DEVICES

(71) Applicant: Adobe Systems Incorporated, San Jose, CA (US)

(72) Inventors: R. Brett Marshall, Redmond, CA (US); Patrick Martin McLean, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 274 days.

(21) Appl. No.: 13/653,644

(22) Filed: Oct. 17, 2012

(65) Prior Publication Data

US 2014/0104189 A1    Apr. 17, 2014

(51) Int. Cl.
*G06F 3/041* (2006.01)
*G06F 3/045* (2006.01)
*G06F 3/0488* (2013.01)

(52) U.S. Cl.
CPC ............ *G06F 3/0416* (2013.01); *G06F 3/0488* (2013.01)

(58) Field of Classification Search
CPC . G06F 3/0488; G06F 3/04883; G06F 3/0482; G06F 3/04886
See application file for complete search history.

(56) References Cited

U.S. PATENT DOCUMENTS

| | | | |
|---|---|---|---|
| 4,952,932 A * | 8/1990 | Sugino et al. | 341/23 |
| 5,404,439 A * | 4/1995 | Moran et al. | 715/814 |
| 2002/0112180 A1* | 8/2002 | Land et al. | 713/200 |
| 2006/0033701 A1* | 2/2006 | Wilson | 345/156 |
| 2009/0174679 A1* | 7/2009 | Westerman | 345/173 |
| 2010/0170726 A1* | 7/2010 | Yeh et al. | 178/19.03 |
| 2010/0182247 A1* | 7/2010 | Petschnigg et al. | 345/173 |
| 2010/0214232 A1* | 8/2010 | Chan et al. | 345/173 |
| 2011/0102357 A1* | 5/2011 | Kajitani | 345/173 |
| 2011/0175821 A1* | 7/2011 | King | 345/173 |
| 2011/0181529 A1* | 7/2011 | Capela | G06F 3/0488 345/173 |
| 2011/0205163 A1* | 8/2011 | Hinckley et al. | 345/173 |

* cited by examiner

*Primary Examiner* — Alexander Eisen
*Assistant Examiner* — Nan-Ying Yang
(74) *Attorney, Agent, or Firm* — Kilpatrick Townsend & Stockton LLP

(57) ABSTRACT

Techniques and systems for facilitating the creation of electronic content on an editing canvas are disclosed. One example involves displaying an editing canvas on a touch screen of an electronic device, displaying a touch block object overlaying a portion of the editing canvas, wherein the touch block object blocks unintentional touches in an area of the touch screen associated with the touch block object, and changing a position of the touch block object with respect to the editing canvas responsive to receiving touch input on the touch screen to change the position of the touch block object. The touch block object may provide easy and convenient access to one or more editing tools or other feature for editing content on the canvas.

20 Claims, 14 Drawing Sheets

MOVEABLE INTERACTIVE SHORTCUT TOOLBAR AND UNINTENTIONAL HIT REJECTER FOR TOUCH INPUT DEVICES

FIELD

This disclosure relates generally to computer software and hardware and more particularly relates to user interface features used on touch input-based electronic devices.

BACKGROUND

On many touch input-based devices such as many tablet devices with touch capacitive screens, unintentional touches such as a resting palm are often misidentified as intentional touch input. Another issue on relatively large touch screen devices is that accessing user interface features presented at the edge of the screen require inconvenient or otherwise undesirable large arm movements. Another issue on such devices is that a keyboard input device is often unavailable to provide a convenient way of accessing features. Specifically, shortcuts that are available with shortcut key combinations made by a non-dominant hand resting on a keyboard are not easily accessible or available on many touch input-based devices.

SUMMARY

One exemplary embodiment involves displaying an editing canvas on a touch screen of an electronic device, displaying a touch block object overlaying a portion of the editing canvas, wherein the touch block object blocks unintentional touches in an area of the touch screen associated with the touch block object, and changing a position of the touch block object with respect to the editing canvas responsive to receiving touch input on the touch screen to change the position of the touch block object.

Another exemplary embodiment involves displaying an editing canvas on a touch screen of a touch-based electronic device, displaying a touch block object overlaying a portion of the editing canvas, wherein the touch block object blocks unintentional touches in an area of the touch screen associated with the touch block object, and providing an editing feature for editing content on the canvas, the editing feature provided responsive to receiving input at the touch block object to access the editing feature.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
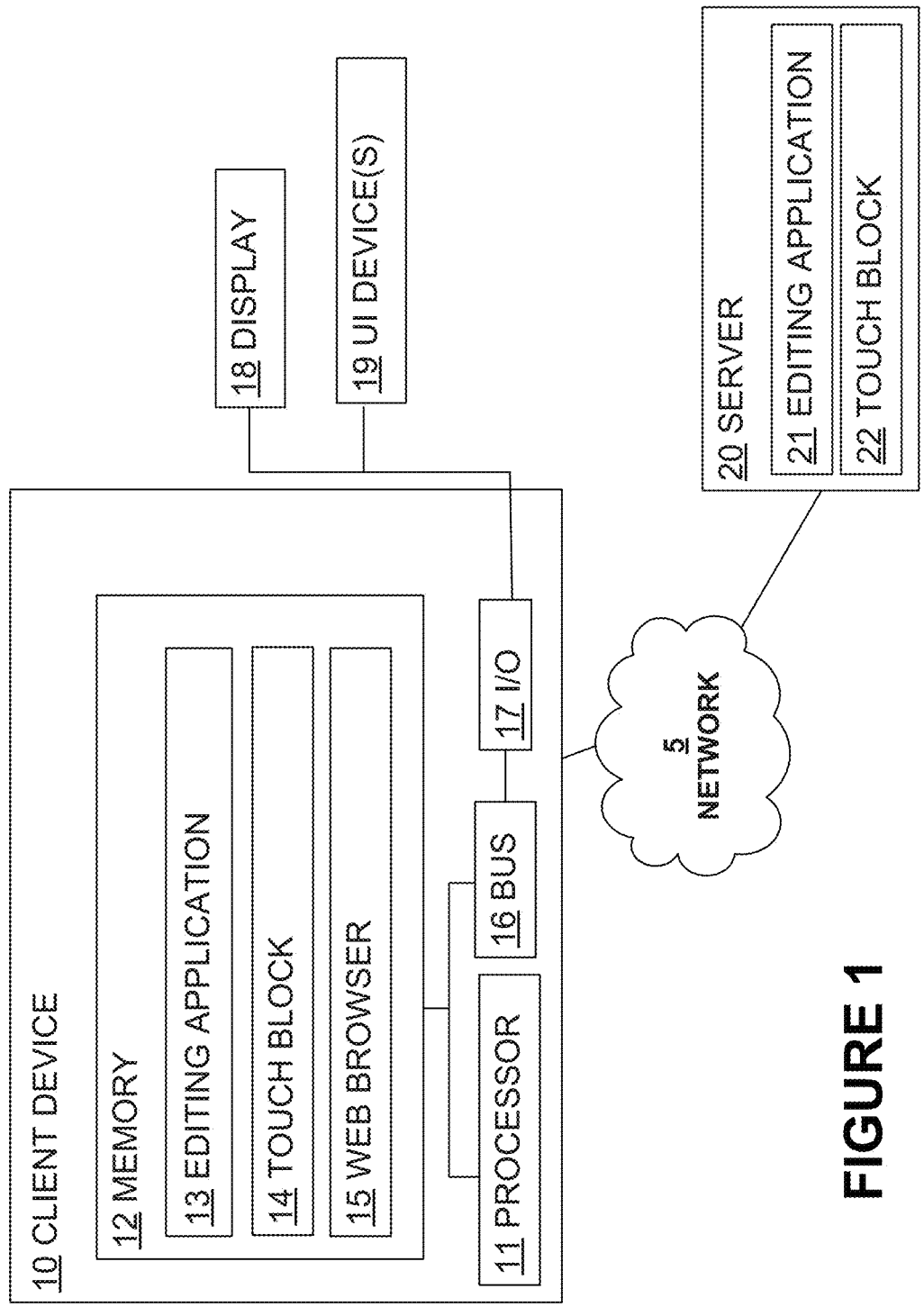
FIG. 1 is a block diagram depicting exemplary computing devices in an exemplary computing environment for implementing certain embodiments.

Improved systems and methods facilitating the creation and editing of sketches, drawings, charts, applications, games, photographs, videos, and other electronic content are disclosed herein. One exemplary embodiment involves displaying an editing canvas on a touch screen of an electronic device. A touch block object such as a partially transparent rectangle is displayed overlaying a portion of the editing canvas. The displayed touch block object identifies to the user that touching an area on the screen will not be recognized as a touch input. Thus, resting a palm and other unintentional touches in that area will not be recognized as touch input. The touch blocked area may be the area of the touch block object, e.g., the area under the displayed rectangle. Alternatively, the touch blocked area may prevent touches in other associated areas from being recognized as touch input. For example, if a rectangular touch block object is displayed directly under a portion of the canvas that is currently receiving stylus editing input, the application providing the touch block object may determine that the stylus is in the user's right hand and, based at least on this determination, assume that the user's left hand may rest on the touch block object and/or in the area of the touch screen that is to the left and below the displayed touch block object. Touch inputs received in these additional areas may also not be registered as touch input.

The touch block object may be initially positioned and configured based on user information, e.g., identifying which hand is the user's dominant or drawing hand, and/or based on input from the user, e.g., identifying a desired initial location, size, shape, and/or orientation for the touch block object. The touch block object may additionally or alternatively be initially positioned and configured based on other information. As examples, the initial position of a touch block object may be based on the location of an object selected on the editing canvas, a location of a last edit made on the canvas, a location of editing that is currently occurring on the canvas, etc. The touch block object may additionally or alternatively be initially positioned and configured based on prior user interaction, e.g., determining based on a user selecting an undo command related to undoing the adding or editing of content in an area of the touch screen that the touch block object should initially be positioned prevent recognition of touch input in that area of the touch screen.

The touch block object may also be moveable and otherwise reconfigurable relative to the editing canvas. It may be repositioned based on user input. As examples, a pinch touch input gesture may reduce the size of the touch block object, a two finger left to right touch input gesture may move the touch block object to the right, etc. Alternatively or additionally, it may be repositioned automatically or semi-automatically. For example, it may be repositioned in response to a change to canvas display characteristics, e.g., zoom, orientation, point(s) of focus or current editing, etc.

A touch block object may additionally or alternatively provide easy and convenient access to one or more editing tools or other features for editing content on the canvas. For example, it may provide buttons that are accessible using specific input types (e.g., buttons that can be selected by a stylus but that are not selected by a hand resting on them). Icons representing features may also be presented in panels that expand or are otherwise presented in proximity to the touch block object. Such icons may provide convenient access to editing features in the case in which the touch block object is located proximate to a portion of the canvas in which editing is occurring, a user can access the features conveniently, e.g., without having to make large arm movement to access icons located distally, for example, at an edge of the screen. The features made available by the touch block object may be customized and/or selected based on the editing context, e.g., based on a type of object or editing feature that is currently being used. In this way, the touch block object may function as a user interface consolidator of relevant contextual user interface elements. It may bring user interface elements to a convenient area proximate to where the user is looking and/or working so that the user is not burdened with having to distract their focus or use larger arm movements to access remote user interface features. These characteristics may be particularly beneficial on devices that do not provide the convenience of shortcut keys accessed through physical keyboard devices.

One embodiment provides a multi-function touch toolbox that provides a moveable, interactive shortcut toolbar and unintentional hit rejecter for large format tablet devices. Additional features may also be provided by such a toolbox. For example, the toolbox may also function as a ruler providing measurement information or a drawing guide such as a straight edge or stencil.

These illustrative examples are given to introduce the reader to the general subject matter discussed here and are not intended to limit the scope of the disclosed concepts. The following sections describe various additional embodiments and examples with reference to the drawings in which like numerals indicate like elements.

Referring now to the drawings, FIG. 1 is a block diagram depicting exemplary computing devices in an exemplary computing environment for implementing certain embodiments. Applications and other electronic content executes or is otherwise used on the exemplary computer device 10 and are shown as functional components or modules. As is known to one of skill in the art, such applications and content may be resident in any suitable computer-readable medium and execute on any suitable processor. For example, as shown the network device 10 comprises a computer-readable medium such as a random access memory (RAM) 12 coupled to a processor 11 that executes computer-executable program instructions and/or accesses information stored in memory 12. Such a processor 11 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Objective-C, Visual Basic, Java, Python, Perl, JavaScript, and ActionScript.

The device 10 may also comprise a number of external or internal devices such as a mouse, a CD-ROM, DVD, a keyboard, a display, audio speakers, one or more microphones, or any other input or output devices. For example, device 10 is shown with a display 18 and various user interface devices 19. A bus, such as bus 116, is included in the device 10. Device 10 could be a personal computing device, a mobile device, or any other type of electronic devices appropriate for providing one or more of the features described herein. In one exemplary embodiment, device 10 is a touch-screen device such as a tablet or touch-screen mobile phone. In one exemplary embodiment, a diagonally-measured screen size of such a touch screen is within a range of 5 inches to 9 inches, inclusive.

FIG. 1 illustrates an exemplary device 10 that comprises, in memory 12, an editing application 13 for editing of electronic content. Electronic content includes, but is not limited to, electronic documents, text, images, graphics, web pages, applications, and rich Internet applications. An exemplary system could comprise a touch screen to provide display 18 and a UI device 19 and include a processor 11 for executing instructions stored in a computer-readable medium on one or more devices such as device 10 to provide an application for editing electronic content. Editing application 13 may itself comprise sub-modules. One exemplary sub-module is a touch block 21 used to provide a touch block object for use on a user interface provided by the editing application 13. Touch block 14 may alternatively be provided by a separate application. Moreover, editing application and/or touch block functionality may also alternatively be provided in part or in whole from a separate server such as in the case of a cloud-based service. As a specific example, server 20 may provide an editing application 21 and touch block functionality 22 for use on client device 10, for example, through web browser 15.

Figure 2:
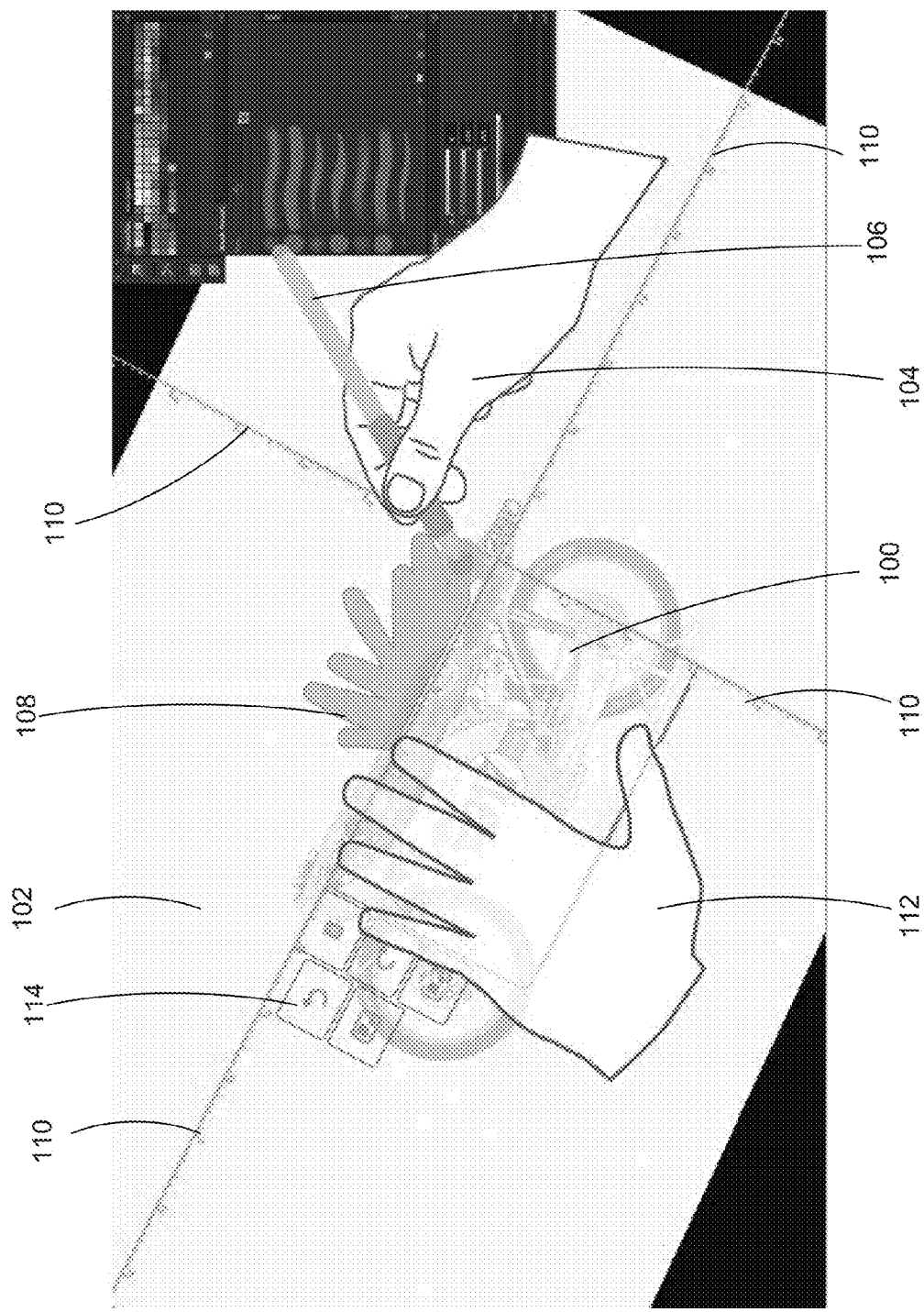
FIG. 2 illustrates an exemplary touch block object on an image being created on an exemplary editing canvas displayed on a touch-based electronic device.

FIG. 2 illustrates an exemplary touch block object 100 on an image being created on an exemplary editing canvas 102 displayed on a touch-based electronic device (not shown). The touch block object is associated with an area in which touch input is not registered. In this example, that is the area under the rectangle displayed as the touch block object 100. In this example, the touch block object 100 is implemented to be similar in appearance to a transparent rectangular ruler. In this example, a user's dominant hand 104 uses stylus 106 to add content 108 to the electronic content being edited on the editing canvas 102. Ruler markings 110 are displayed and are positioned and oriented based on the position and orientation of the touch block object 100. In this example, the user's non-dominant hand 112 partially rests on the touch block object 100. The exemplary touch block object 100 also provides convenient access to the editing application's features via displayed buttons, such as undo feature button 114.

Use of a touch block object 100 can be initiated in a variety of ways. For example, the touch block object 100 may appear in response to a particular touch gesture such as a five finger pinch. Use of this type of gesture may be intuitive because it corresponds to the real world multi-finger gesture of picking up a transparent ruler or using multiple fingers to hold such an object steady on top of artwork and the like. Similarly, use of the touch block object 100 can be concluded in a variety of ways. For example, an input gesture pushing the touch block object 100 quickly towards a side of the screen may be interpreted as a discard gesture similar to a user sliding a physical ruler out of the way when it is no longer needed.

A touch block object 100 can be configured to have similarities with real world objects, such as napkins, scraps of paper, rulers, and the like, that artists and draftsman have employed to avoid smudging creative works done on paper. In the electronic context, a touch block object 100 is defined and touch input in that region is turned off. The region may be graphically identified by the displayed object. For example, in the circumstance of a rectangular touch block region, a rectangular object may be displayed to overlay at least a portion of the drawing canvas area such that input within that rectangle is ignored. The displayed rectangle may comprise only an outline and/or may be transparent or semitransparent to avoid or limit the obscuring of content being created on the canvas area.

The location and/or orientation of the touch block object 100 may initially be set to default values and/or may be based upon other input. The location of the touch block object 100 may be based on input used to initiate use of the touch block object 100. For example if a five finger pinch gesture is used to initiate use, the position and/or orientation may be based on that input. Additionally or alternatively, the location of the touch block object 100 may be based on other input such as an identification of a stylus or pen device being used at a location. In such a circumstance, for example, the touch block object 100 may be positioned below and to the left of that position to provide an input blocked region appropriate to block input of the left hand of a right-handed user. The position and orientation of the touch block region may be based on other factors such as information known or identified about the user, e.g., which hand is the user's dominant hand, etc., and/or information about the device, e.g., the device's current viewing orientation, etc.

The location, orientation, shape, size and other attributes of the touch block object 100 may be controlled by the user. For example, orientation may be adjusted based on received touch inputs, e.g., a five figure turning gesture, etc. Gestures used to control use, location, orientation, and the like, of a touch block object 100 may be based on real world gestures used to control such attributes of a napkin, paper, ruler or other physical device used by an artist in creating content on paper. As a specific example, a user may rest all five fingers of the non-dominant hand on the touch block object 100 and the touch block object 100 may move as the user slides and rotates their hand in different ways in the same way that a napkin would move if a user had five fingers resting on it and adjusted the napkin position with hand movements. When a user desires to not use the touch block object 100, it can be physically tossed to the edge of the screen with a swipe gesture and may respond by sliding to the edge of the canvas area or screen and stop just before being entirely removed from the screen such that only a slight visual indicator (e.g., a small fraction of the touch block object 100) is still visible at the edge of the canvas or screen to be brought back for use by a swipe back from there or other gesture. Responding to actions correlated with these and other real world objects, physical object control gestures can make use of the touch block object 100 more intuitive, natural, and useful to users.

A touch block object can be overlain upon or otherwise used with a canvas, art board, and the like upon which electronic content is created, herein referred to as an editing canvas or simply as a canvas. In such an environment, the canvas may be moved, altered, zoomed also. Allowing both the canvas and touch block object 100 to be moved relative to one another, a convenient editing view can easily be achieved by a user. Such movements can be controlled by fast and simple touch-based interactions that are consistent with real world interactions that artists and architects use.

Figure 3:
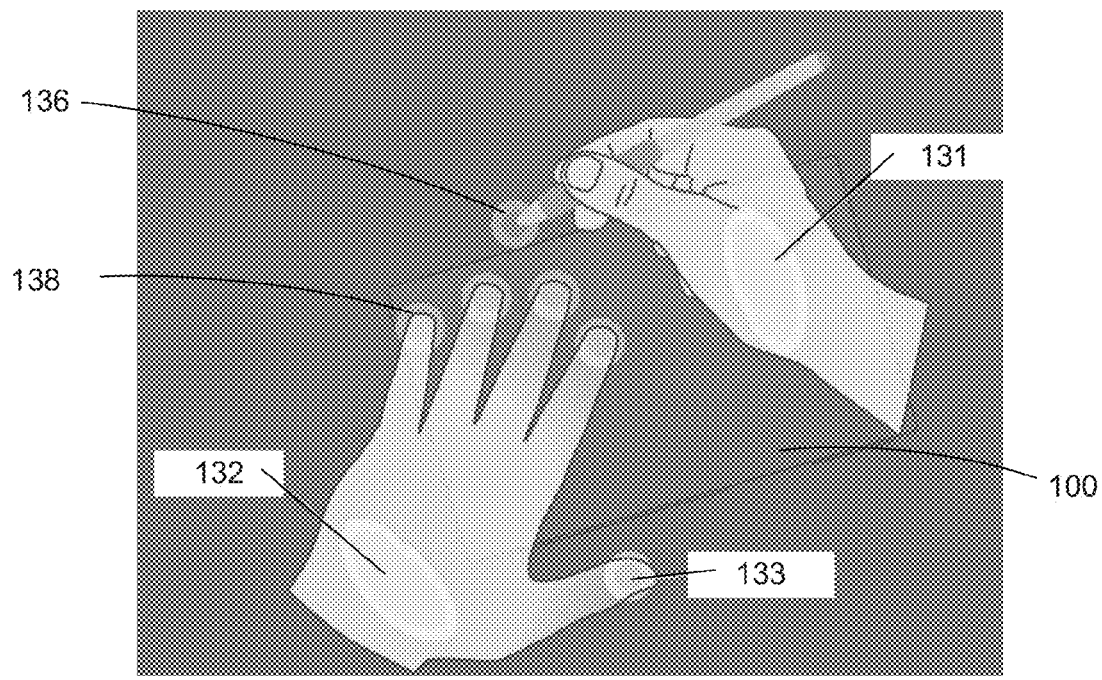
FIG. 3 illustrates an example of a user's hand positioned with respect to an exemplary touch block object.
Figure 4:
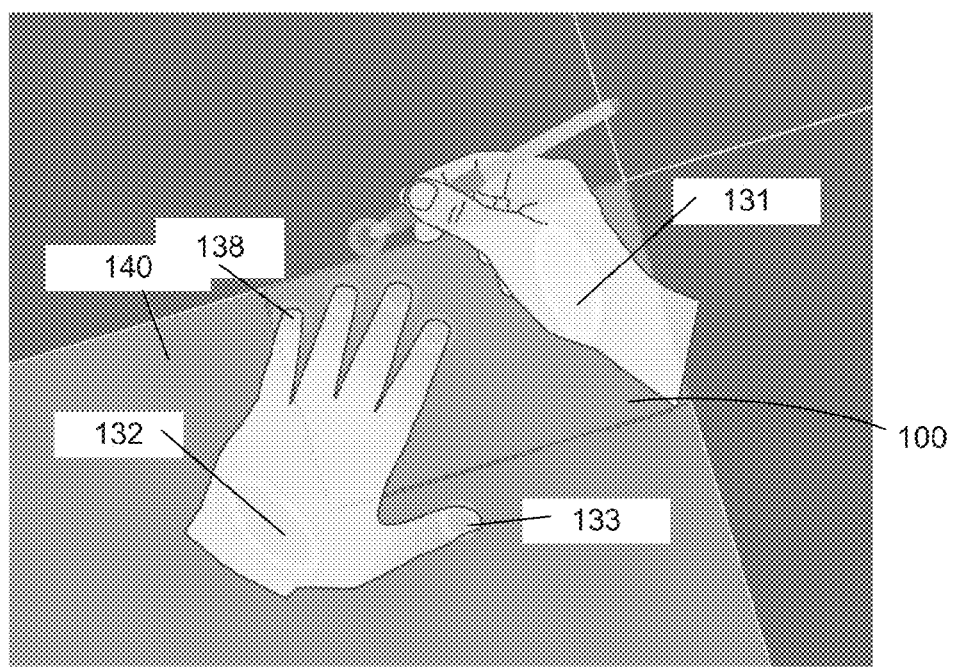
FIG. 4 illustrates a touch block region blocking certain touches of the user's hand positions of FIG. 3.

FIGS. 3 and 4 illustrate an example of a user's hand positions with respect to an exemplary touch block object 100. In this example, the user's dominant hand works with a stylus to provide touch input at the display location 136. Other contact with the touch screen is not intended by the user to be recognized as input altering the editing canvas area upon which the user is creating content. The touch block object 100 provides a visual indicator identifying which areas of the display will not register hits, touches, and the like. In this example, that area of the display that will not register hits, touches, and the like is touch block region 140 and includes the area of the touch block object 100 as well as the areas to the left and below the touch block object 100. Thus, the palm hit 131, finger hits 138, palm hit 132, and thumb hit 133 are not registered as hits.

Figure 5:
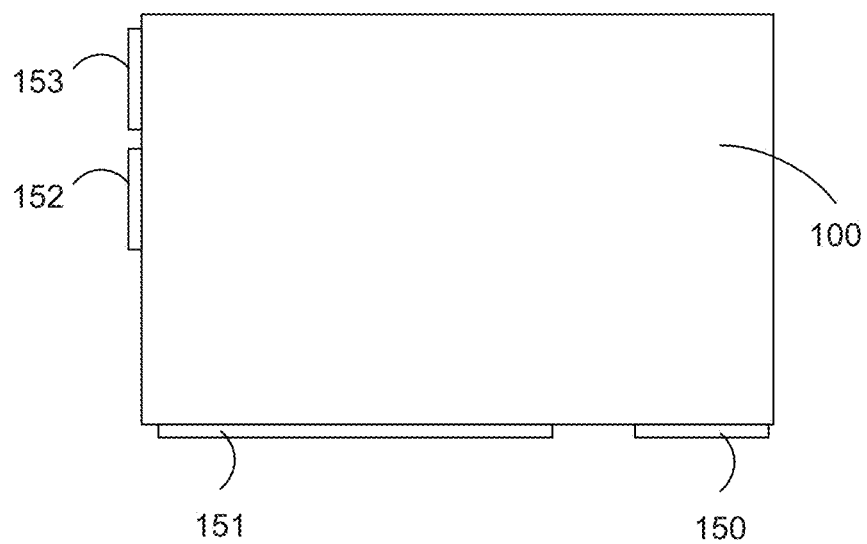
FIG. 5 illustrates affordances on the sides of a touch block object to provide indications that additional interactive features of the touch block object can be accessed.
Figure 6:
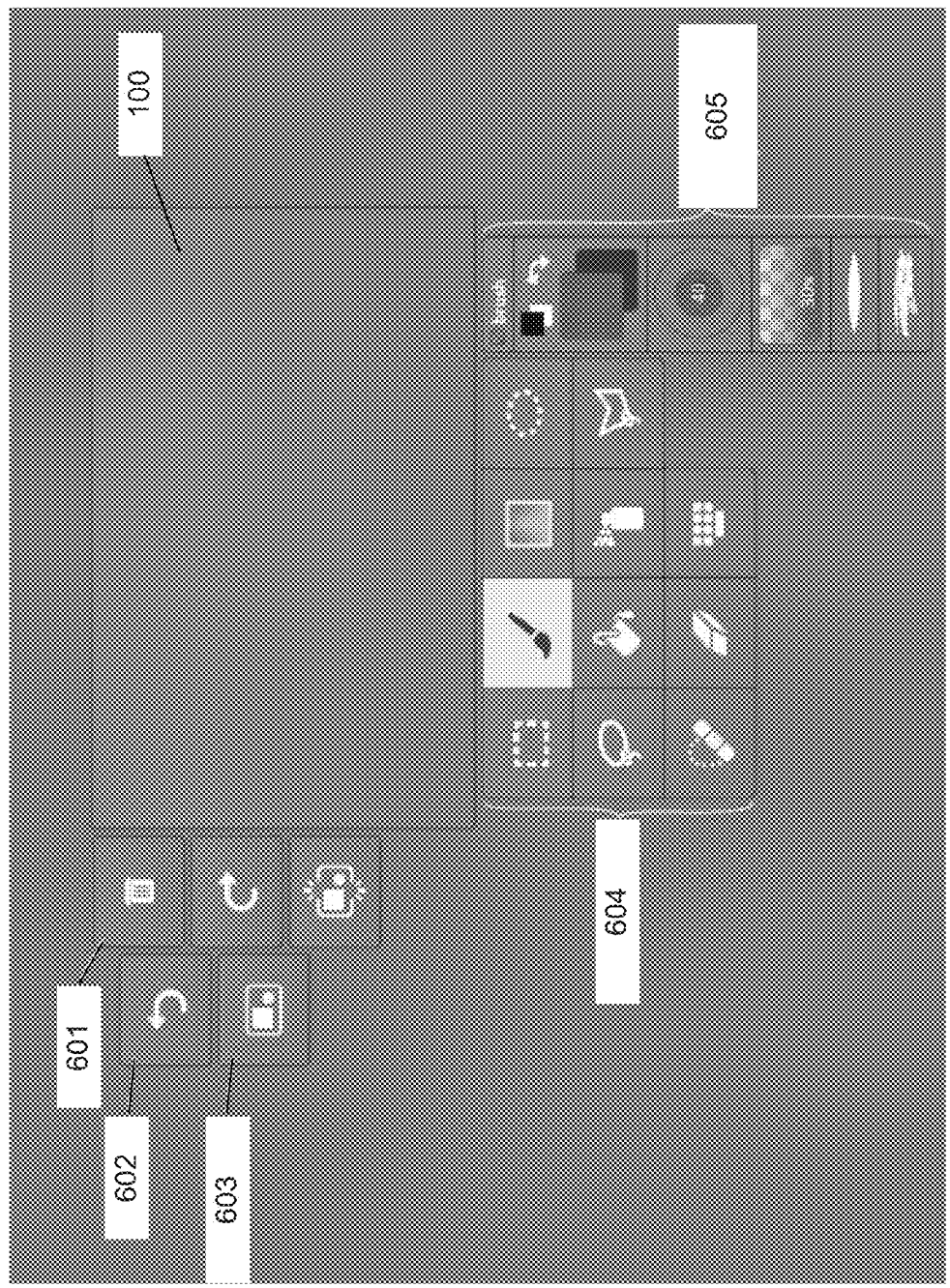
FIG. 6 illustrates tool features exposed by interaction with the exemplary affordances of FIG. 5.

FIG. 5 illustrates affordances on the sides of touch block object 100 providing indications that additional interactive features of the touch block object can be accessed. The affordances provide subtle visual cues on the outside edge of the touch block object 100 and, in this example, suggest visually that a swipe or tap gesture provides access to quick touch tools and other features. In this example, touch gestures, for example, two finger swipes at the locations of the affordances 150, 151, 152, 153 provide access to additional interactive features. Each affordance 150, 151, 152, 153, 154 exposes a different set of interactive features. FIG. 6 illustrates tool feature icons 601, 602, 603, 604 605 exposed by interaction with the exemplary affordances 150, 151, 152, 153 of FIG. 5. Providing such buttons can be particularly beneficial in computing environments in which a keyboard, and therefore key board shortcuts, are not available. Moreover, where icons 601, 602, 603, 604 605 are provided in close proximity to the touch block object 100, the icons 601, 602, 603, 604 605 and their associated features can be easily accessible by the user. For example, the user may be able to access the icons 601, 602, 603, 604 605 with a non-dominant hand without having to move the hand more substantial distances to access at the top or other remote location on the user interface. Accordingly, certain embodiments provide an improved interface for large touch screen interactions since keyboard shortcut keys may not be available or convenient. Interactions and hot key functionality of the keyboard used on desktop devices can be translated to features accessible from a touch block area 100 to provide a touch toolbox to the user. Such a touch toolbox allows the user to work just as quickly and easily, if not faster than they worked in the traditional desktop environment. The improved interface can thus rely on icon-based and graphically driven buttons and a simple repertoire of touch gestures to provide convenient access to editing tools and other features. The tools and other features that are available and how they are arranged in extendable tool panels can be customized by a user. For example, a user can edit which tools are available by identifying tools that he or she uses most as favorites.

In the illustrative embodiment of FIG. 6 panels with tool icons 601, 602, 603, 604 605 are illustrated extending from the touch block object 100. The placement of such panels and the associated icons can vary depending upon configuration, touch block object 100 location, and other considerations. Icons may appear on the area of the touch block object 100 itself. In another example, tool icons are positioned based on proximity of the touch block object 100 to one or more edges of the touch device. For example, if the touch block object 100 is near an edge such that there is insufficient room to display one or more icons between the touch block object and the edge, the icons can be positioned along another side of the touch block object. The affordances may change location to indicate this change. In another example, touch block object feature icons may consistently extend from the same side of the touch block object regardless of the position of the touch block object 100 and the user can simply be required to move the touch block object if one or more features are beyond the edge of the touch device screen.

One advantage of providing feature icons near the location of the touch block object is that the user's primary hand may also be in close proximity to the icons. The touch block object 100 and/or its associated tools may be configured to respond to input from a stylus or other instrument controlled by the user's dominant hand. For example, certain interactions may require selection made with a stylus.

The features accessed through interaction with a touch block object 100 may be context specific. For example, the subset of tools for which icons are presented may depend upon which object is currently selected. As a specific example, an icon for a tool for filing shapes with color may be presented when a triangle is selected but not when a bitmap image is selected.

Figure 7:
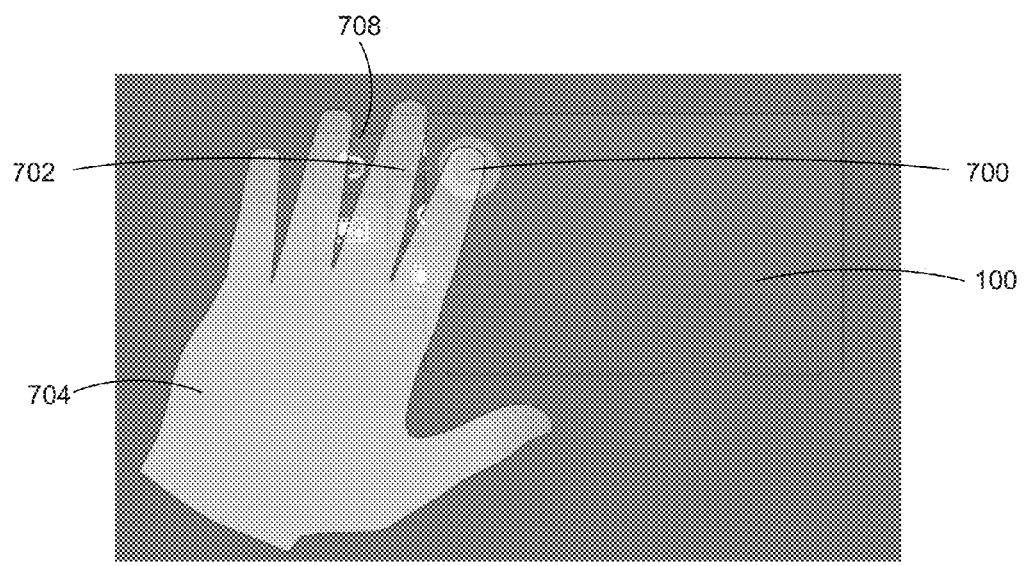
FIG. 7 illustrates a tool panel access gesture.
Figure 8:
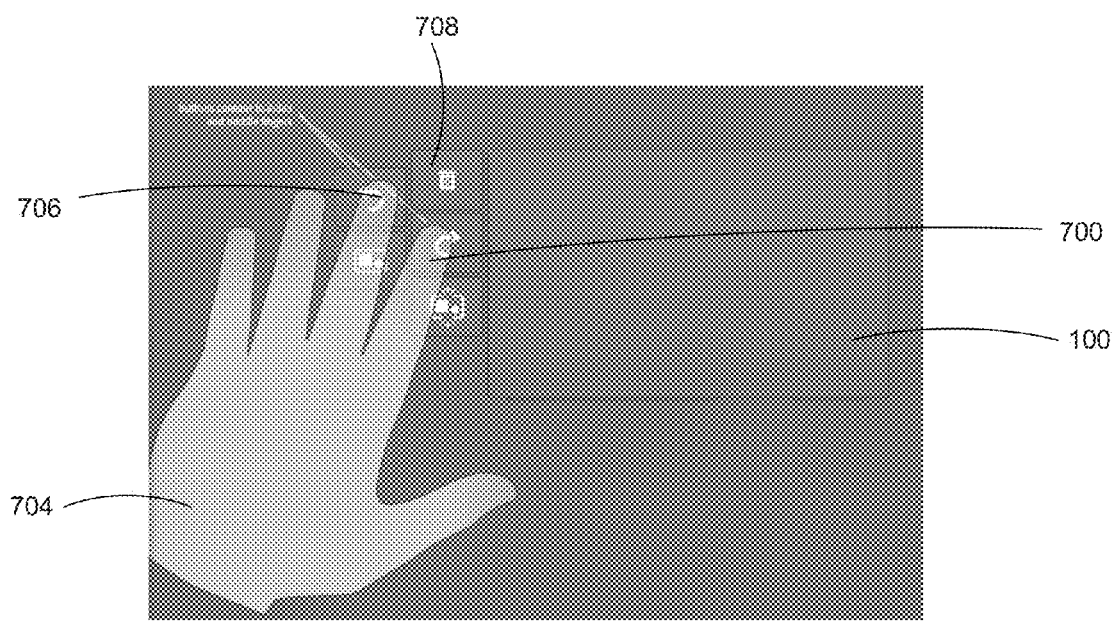
FIG. 8 illustrates how the user's hand is naturally positioned for accessing the exposed tool icons after making the tool panel access gesture of FIG. 7.

FIG. 7 illustrates a tool panel access gesture 702 made by a single finger right to left swipe and FIG. 8 illustrates how the user's hand 704 is, as a result of making the gesture 702, positioned for fingers 700, 706 to easily access the exposed tool icons of the tool access panel 708. Different types of gestures may be interpreted as different types of input with respect to the touch block object 100. For example, single finger gestures may access tools while multi-finger gestures (e.g., 4 or 5 fingers) may be used to move, rotate, resize, or otherwise reconfigure other aspects of the touch block object 100.

The position of quick touch icons can reflect ergonomic considerations. This can be particularly beneficial with respect to large format touch displays in which one or more tool panels provide the potential to replace the keyboard entirely and thus be subject to frequent use. It can be designed with the shape, position, size, and other features of human hands and/or devices designed for use in interacting with the touch interface. It may be customized for a particular user's hand. For example, a user could import or otherwise capture an image of their hand that is used to customize tool icon position, size, relative position, etc.

Tool icon position can also be based on tool priority, preferences, relative usage, context, and other applicable factors. As one example, for the sake of accessibility, primary tool icons may be positioned based on the expected one or more most convenient access points for selection by an index finger and middle finger of a non-dominant hand. Tools can be positioned relative to one another so that rotating hand orientation is not required to select one or more of the icons via the user's fingers.

If the touch block object 100 is positioned at an angle (e.g., relative to the canvas or display screen) the icon panels may be presented at the same angle. In other words, the panels may, for example, extend from the side edges of the touch block object regardless of its orientation. This may be more convenient for a user, for example, in the circumstance in which a user tends to orient the touch block object 100 in a consistent orientation with respect to the user's non-dominant hand. It may also facilitate use if a tool panel extends from the touch block object 100 in a consistent manner regardless of the touch block object 100 orientation and position.

The tools and tool panels that are accessible from a touch block object 100 may be customized. This is particularly useful in circumstances in with the editing application provides tens, hundreds, or even thousands of different features. In one example, a user selects a subset of the tools as favorites and has quick and easy access to those tools from the touch block object 100. In one example, one of multiple panels extendable from a touch block object 100 provides access to user favorite tools and one or more other panels provides access to standard tools. The tools available from a touch block object may also be selected in groups and/or added for access via the touch block object 100 within a single panel. In other words, a user may select to include a "photo editing" tool panel on his or her touch block object 100 but may decline to include a "line drawing" tool panel on his or her touch block object 100. Custom tools and tool panels may also be determined automatically, for example, based on automatic recognition of which tools are used frequently and/or recently.

The provision of tool panels, rulers, and/or drawing guides from a touch block object 100 provides an enhanced drawing experience such that drawing on a tablet or other touch device can seem much more like drawing on a drawing table. The experience can be enhanced, for example, by the extensive number of tools a designer might have at their disposal and available within a relatively small and self-contained module.

Figure 9:
FIG. 9 illustrates an interactive ruler functionality of a touch block object.
Figure 10:
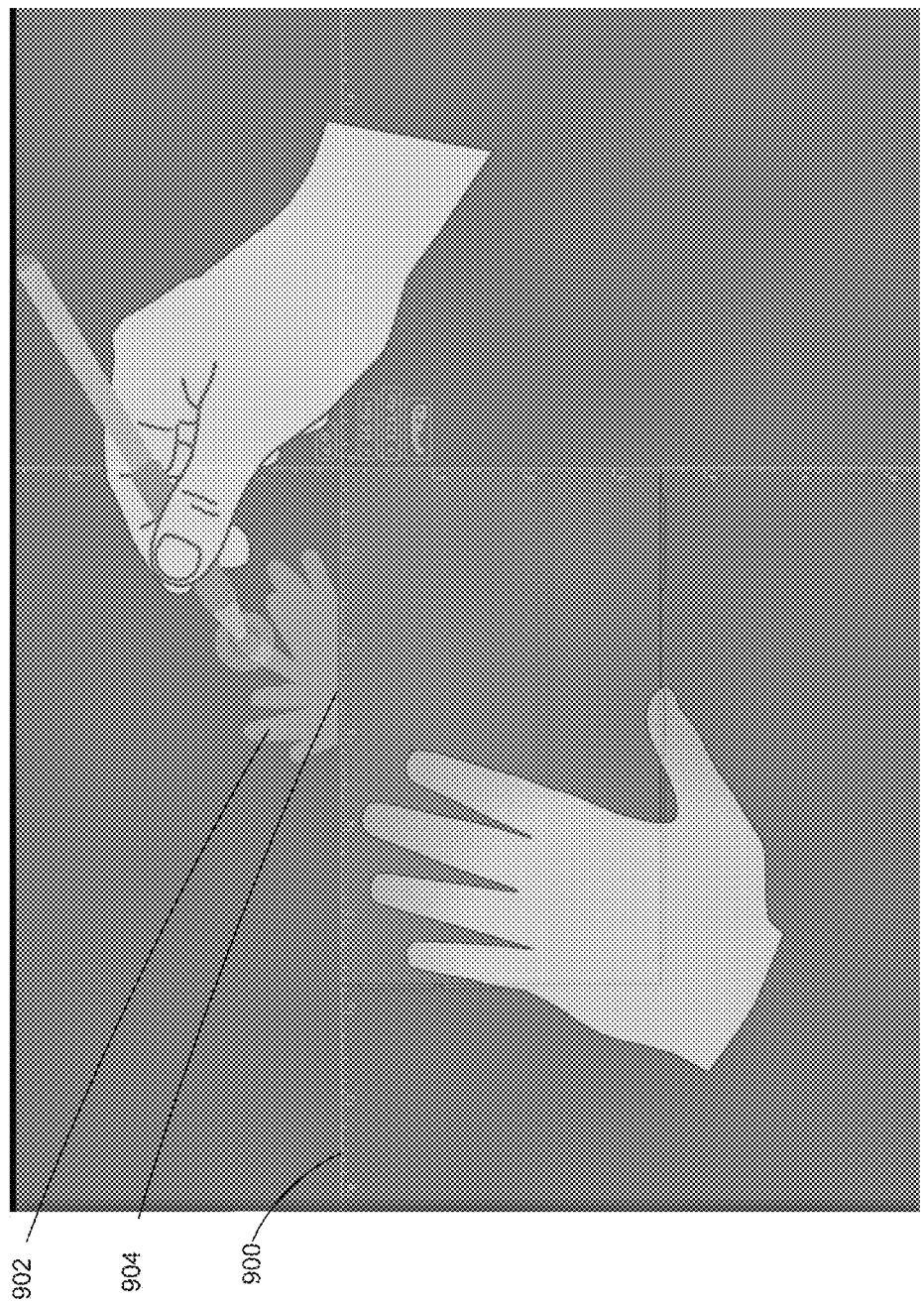
FIG. 10 illustrates using the edge of the interactive ruler of FIG. 9 as a drawing guide.

FIG. 9 illustrates an interactive ruler 900 of a touch block object 100. The ruler 900 acts as a visible extension of the edge of the touch block object 100. In a ruler mode, a designer may have precise control over orientation and position of the touch block object 100 and thus its associated interactive ruler 100 relative to the canvas upon which they are used. The interactive ruler 900 may provide measurements and/or a straight edge. FIG. 10 illustrates using the edge of the interactive ruler 900 of FIG. 9 as a drawing guide. In this example, the drawing 902 has a straight edge 904 along an edge of the interactive ruler 900. Using the edge 904 can be similar to using a straight edge in the context of drawing on paper, i.e., as the user applies brush strokes to create the drawing 902, the visible edge of the ruler 900 prevents the brush from painting beyond that edge. In another embodiment, an edge of the touch block object 100 itself (as opposed to the ruler 900) can additionally or alternatively be used as a straight edge or other drawing guide.

Figure 11:
FIG. 11 illustrates a drawing curve guide feature of the interactive ruler of FIG. 9.

FIG. 11 illustrates a drawing curve feature of the interactive ruler 900 of FIG. 9. In this example, the user can define a custom curve 908, for example, by selecting two points 910, 912 on the interactive ruler 900 and customizing the custom curve 908 to have a desired amount of arc. As a more particular example, the user may use a stylus to select the points and then drag the curve to an appropriate shape. As an alternative, the user may draw out a curve that snaps to fit a constant arc.

Figure 12:
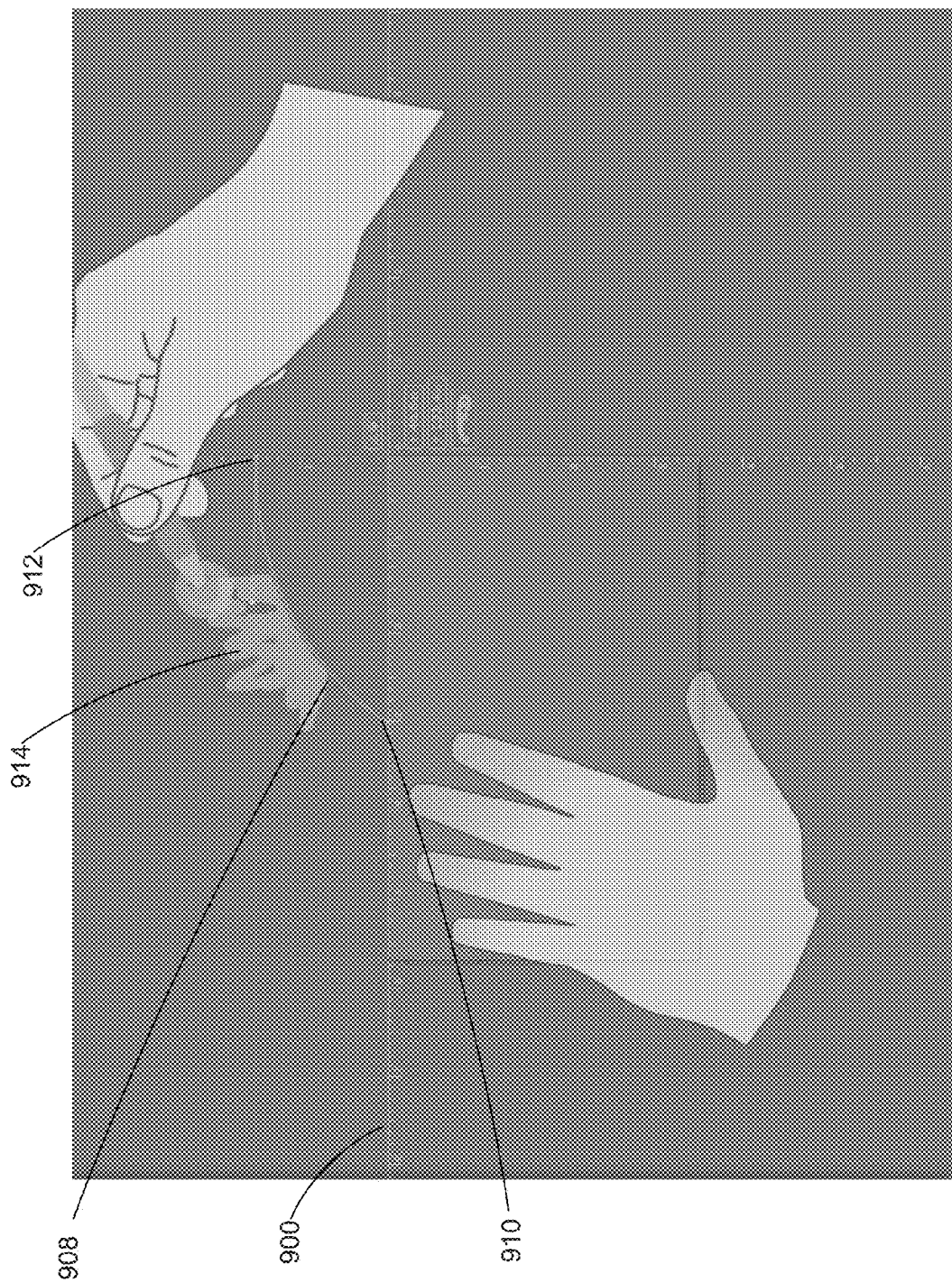
FIG. 12 illustrates how the customer curve of FIG. 11 is used as a drawing guide in the creation of drawing.

FIG. 12 illustrates how the custom curve 908 of FIG. 11 is used as a drawing guide in the creation of a drawing 914. In this example, as a user applies brush strokes the visible edge of the curve prevents the brush from painting beyond that edge.

Drawing edges and other guides can be customized in various ways in conjunction with use of a touch block object 101. In the example of FIGS. 11 and 12, a user is able to quickly define what kind of edge he or she would like to be drawing against using a few simple input selections. More generally, creating snapping points for semi-circles and other shapes along the vertical and/or horizontal ruler edges allows for the extremely fast creation of precise, temporary drawing curves and shapes.

Figure 13:
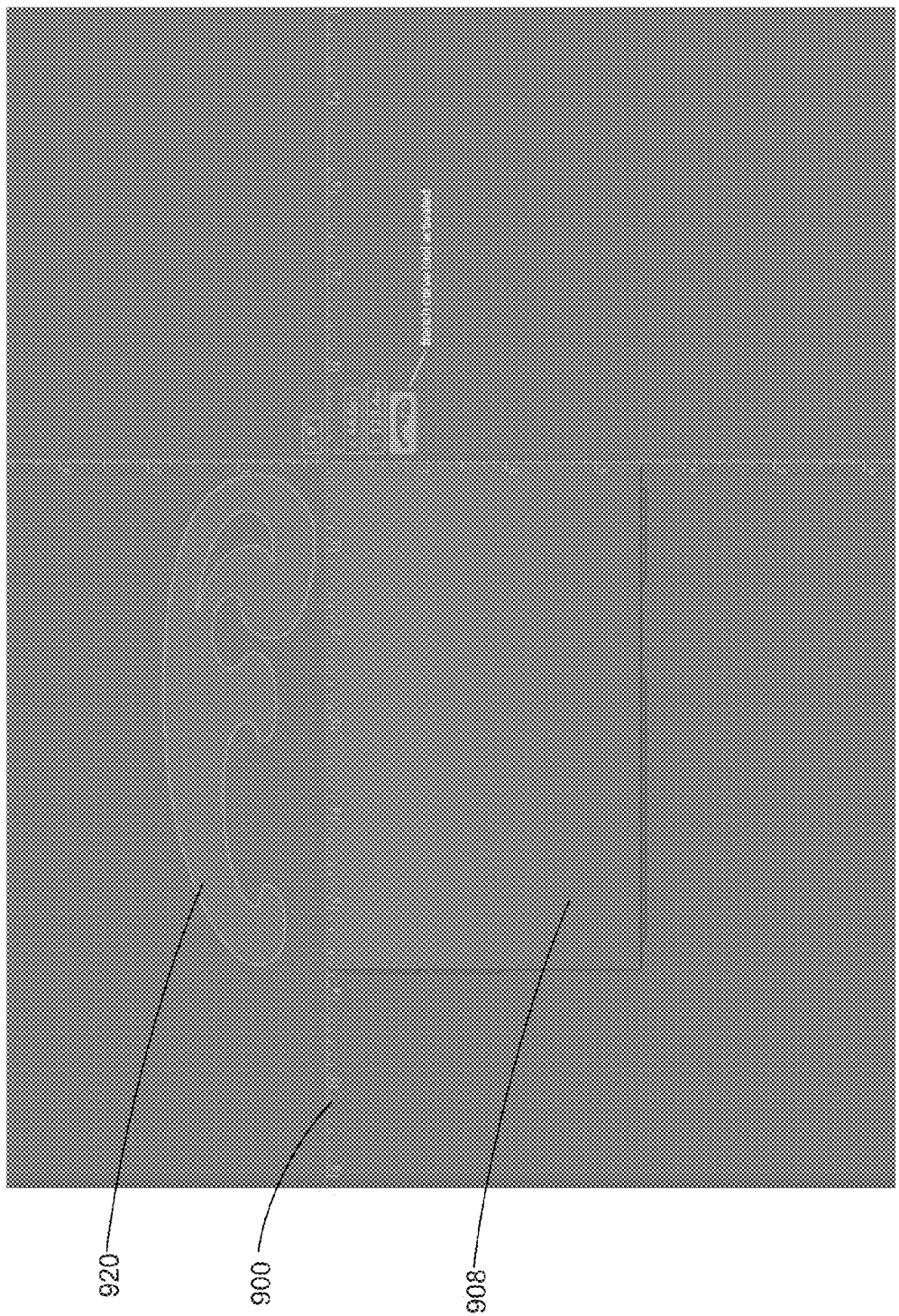
FIG. 13 illustrates a French curve feature of a touch block object.

FIG. 13 illustrates a french curve feature 920 of a touch block object 100. Use of such a guide can be initiated by selection of a tool or other feature on the touch block object 100. The french curve feature may be a movable, resizeable drawing guide or template. In one embodiment, the touch block object 100 provides access to a variety of prebuilt, scalable curves and drawing guides that can act like ruler extension or customizable drawing edges. In one exemplary embodiment, a user is able to customize the shape of the touch block object to provide a desired drawing guide shape or otherwise define the shape of an area that does not respond to touch input.

When a drawing guide is used, it can provide a line or shape with respect to which the user's drawing input is selectively received. With respect to a line, the user's input on one side of the line may be recognized and the user's input on the other side of the line may be ignored or otherwise not recognized as drawing input. Similarly, the user's input on the outside of a shape may be recognized as input while the user's input on the inside of the shape may not be recognized as input. These recognitions can be reversed, for example, in response to user input. As a specific example, the user can select a shape stencil and then select whether input within or outside the stencil will be recognized. Such selections may be inferred based upon stylus or other input. For example, if stylus input is received first within a stencil shape, the application may assume that input within the stencil should be recognized while input outside of the stencil should not be recognized as input. Generally, drawing guides can provide stencil shapes, patterns, geometric, natural, and custom shapes, e.g., dresses, pants, hats, vehicles, houses, lines, circles, squares, primitive objects, and any other appropriate shapes and characteristics.

Features that are on the surface of the touch block object 101 may be selected by a different mechanism, e.g., stylus, than features that are otherwise accessible from the touch block object 101, e.g., via finger touch.

In one embodiment, the touch block object provides cut and/or paste functionality. In such an embodiment, copy and paste commands and/or icons representing individual copied objects may be provided by the touch block object 101. Interaction with the clipboard features may be associated with a particular type of input, e.g., with stylus input, two finger input, etc. in flowchart creation, favorite artistic elements in artistic creation, etc. A touch block object 100 can also have other functions. For example, a user may copy a color or pattern by putting the touch block object 100 over area and taping with stylus to select color. All or a portion of a touch block object 100 could also function like a magnifying glass to zoom in or zoom out on the area that it overlays. Consolidation of user interface features within a touch block object 101 can provide numerous benefits in numerous circumstances.

Figure 14:
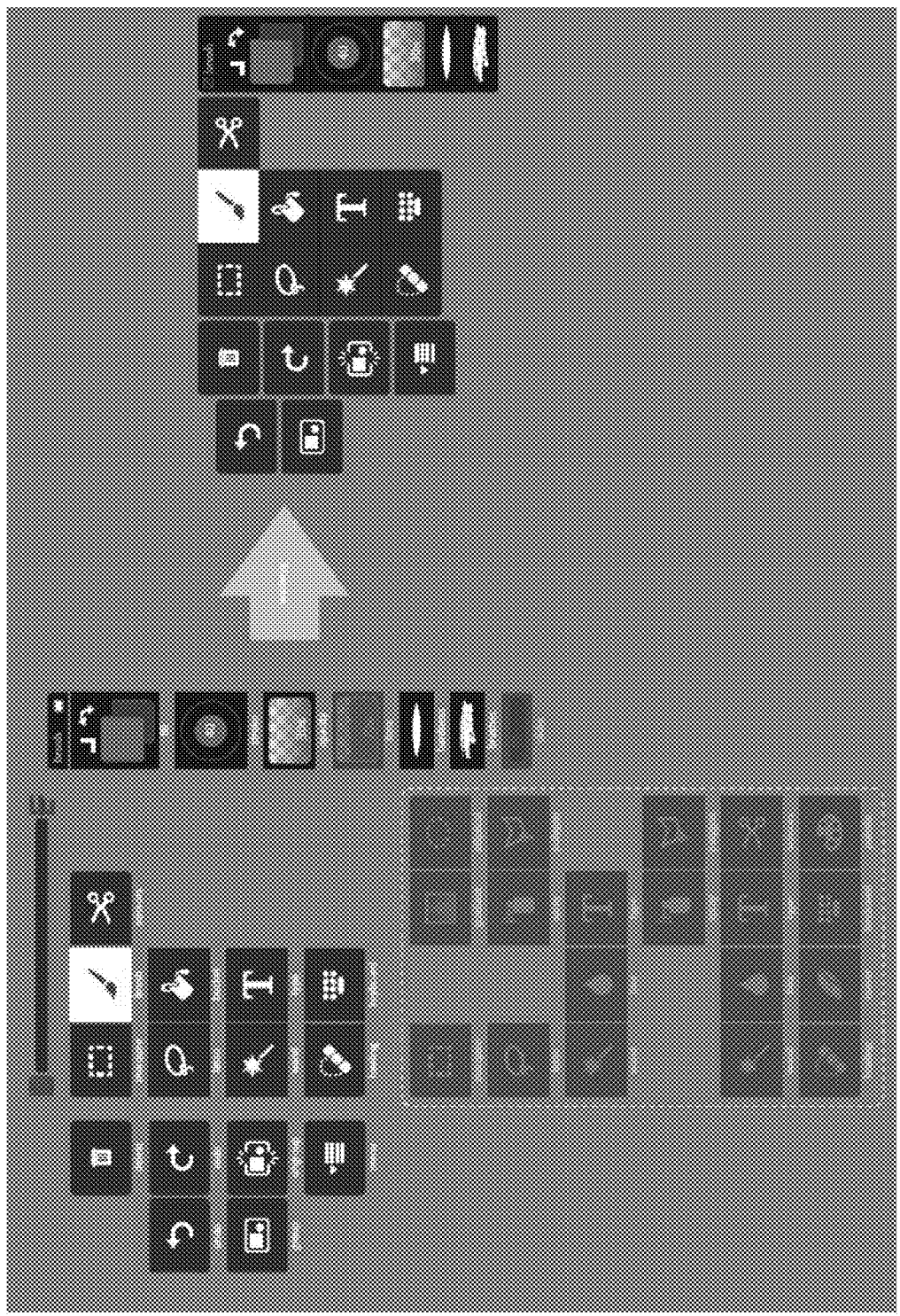
FIG. 14 illustrates an exemplary interface for customizing tools and other features accessible on different customized toolsets to be used on a touch block object.

FIG. 14 illustrates an exemplary interface for customizing tools and other features accessible on different customized toolsets to be used on a touch block object. In this example, a user is able to collapse groups of tools into one icon that is accessible from the touch block object 100. In this example, the user is able to select favorite gestures, e.g., pinch and reverse pinch, to access toolsets collapsed into and expanded from a particular icon. The interface of FIG. 14 may be contextual to a particular editing environment. For example, if a user is editing a particular object such as a bitmap and wants to modify how the touch block object 100 will function or appear when any bitmap object is selected, the user may select a customize mode and use the exemplary interface of FIG. 14 to customize the touch block object 100 for that particular context. The user interface may facilitate the customization of any feature of the touch block object. As examples, it may allow a user to specify position, rotation, size, shape, color, opacity, and other attributes of the touch block object 100 and further specify whether such attributes will be fixed or adjustable during normal use, e.g., whether the user can move the touch block object 100. As another example, it may allow a user to specify whether or how the touch block object 100 is provided, e.g., on demand, automatically presented in specified circumstances, revealed and/or dismissed by particular gestures, etc. The user interface of FIG. 14 may automatically display recent or most used tool and tool sets to facilitate the user's ability to quickly add tools and tool sets that are commonly used by the user. Similarly, it may automatically presents tools and/or tool sets that are appropriate for current task or selected object. The user interface of FIG. 14 provides a means of creating fluid tool clusters without extraneous chrome or other unnecessary or non-functional user interface attributes. The user interface of FIG. 14 can be configured for touch-based control, for example, by presenting large interaction (touchable) targets for fast interaction.

Figure 15:
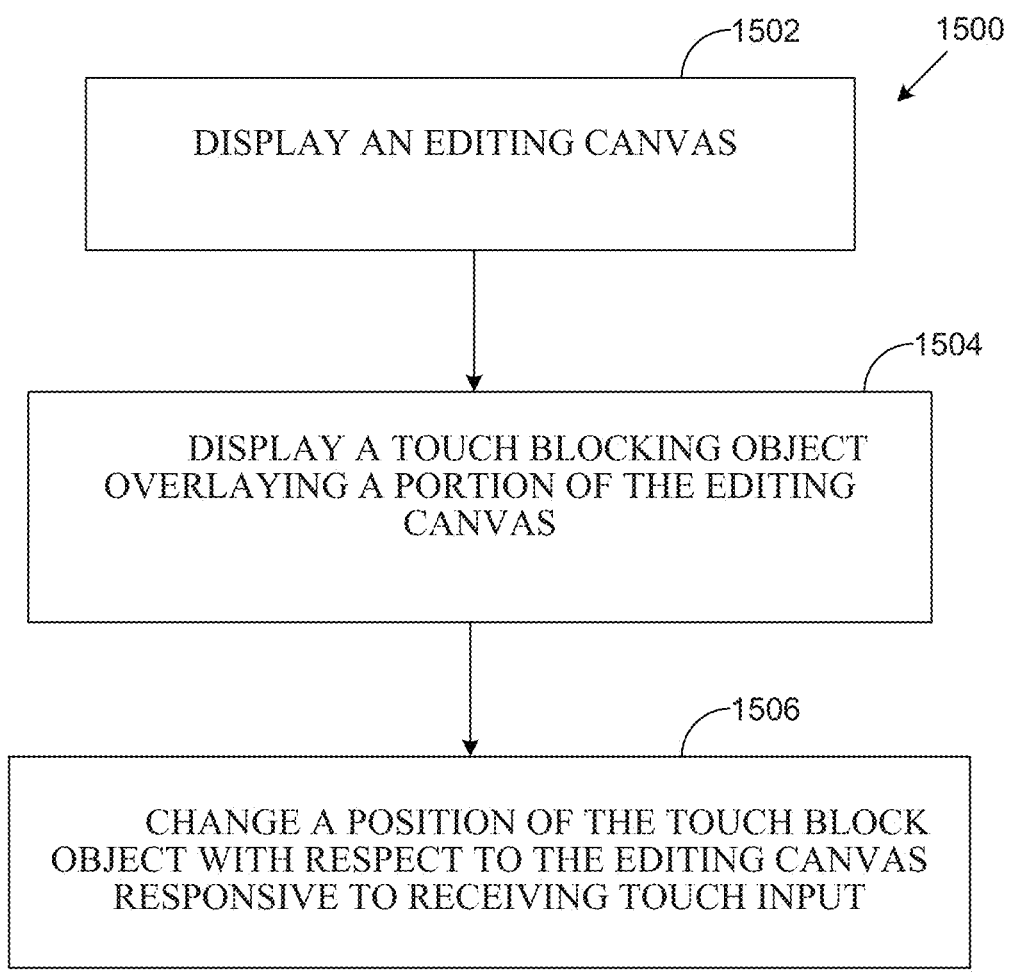
FIG. 15 is a flow chart illustrating an exemplary method of providing a movable touch block object.

FIG. 15 is a flow chart illustrating an exemplary method 1500 of providing a movable touch block object. Exemplary method 1500 may be implemented by a variety of devices including, but not limited to, device 10 shown in FIG. 1, in implemented on a device such as device 10 of FIG. 1, features of exemplary method 1500 may be performed by editing application 13 or editing application 21, for example, by one or both of modules 14 and 22.

Exemplary method 1500 comprises displaying an editing canvas as shown in block 1502. This may involve displaying the editing canvas on a touch screen of an electronic device.

Exemplary method 1500 further involves displaying a touch block object overlaying a portion of the editing canvas as shown in block 1504. The touch block object blocks unintentional touches in an area of the touch screen associated with the touch block object. The area of the touch screen associated with the touch block object may include one or more of an area overlaid by the touch block object and an additional area determined based at least in part on determining a portion of the canvas in which editing is occurring. In one embodiment, at least some content underlying the touch block object is visible through the touch block object. Displaying the touch block object may involve determining a portion of the canvas in which editing is occurring based on input determined to be associated with a dominant user hand and displaying the movable touch block object proximate the portion and in a position determined to block unintended input from a non-dominant user hand resting on the touch screen while the editing is occurring. The position of the touch block object may generally involve a determination of a dominant user hand.

Exemplary method 1500 further involves changing a position of the touch block object with respect to the editing canvas responsive to receiving touch input, as shown in block 1506. This may involve receiving the touch input on the touch screen to change the position of the touch block object.

Exemplary method 1500 may further involve providing an editing feature for editing content on the canvas, the editing feature provided responsive to receiving input at the touch block object to access the editing feature. The method 1500 may further involve customizing an orientation, size, or shape of the touch block object with respect to the editing canvas responsive to receiving touch input on the touch screen. The touch block object may include a displayed ruler and/or an indicator displaying a rotation guide indicating a rotation of a straight edge of the touch block object relative to the canvas. The touch block object may include a drawing guide facilitating drawing content to the canvas area. Such a drawing guide may include a straight edge or stencil, as examples. The touch block object may respond differently to finger touch input and stylus touch input, respectively.

Figure 16:
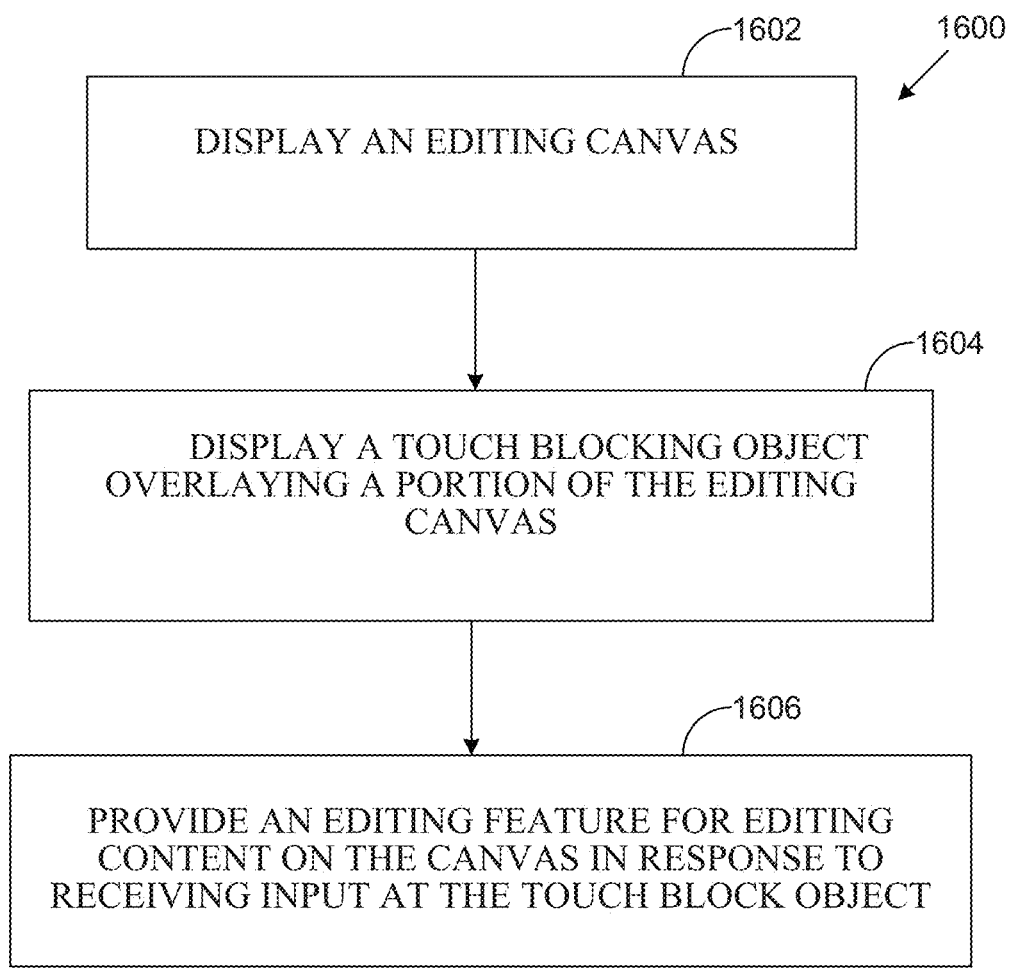
FIG. 16 is a flow chart illustrating another exemplary method of providing a touch block object with tool features.

FIG. 16 is a flow chart illustrating an exemplary method 1600 of providing a touch block object. Exemplary method 1600 may be implemented by a variety of devices including, but not limited to, device 10 shown in FIG. 1. If implemented on a device such as device 10 of FIG. 1, features of exemplary method 1600 may be performed by editing application 13 or editing application 21, for example, by one or both of modules 14 and 22.

Exemplary method 1600 comprises displaying an editing canvas as shown in block 1602. This may involve displaying the editing canvas on a touch screen of an electronic device.

Exemplary method 1600 further involves displaying a touch block object overlaying a portion of the editing canvas as shown in block 1604. The touch block, object blocks unintentional touches in an area of the touch screen associated with the touch block object. The area of the touch screen associated with the touch block object may include one or more of an area overlaid by the touch block object and an additional area determined based at least in part on determining a portion of the canvas in which editing is occurring. In one embodiment, at least some content underlying the touch block object is visible through the touch block object. Displaying the touch block object may involve determining a portion of the canvas in which editing is occurring based on input determined to be associated with a dominant user hand and displaying the movable touch block object proximate the portion and in a position determined to block unintended input from a non-dominant user hand resting on the touch screen while the editing is occurring. The position of the touch block object may generally involve a determination of a dominant user hand.

The exemplary method 1600 further involves providing an editing feature for editing content on the canvas in response to receiving input at the touch block object to access the editing feature, as shown in block 1606. Providing the editing feature may involve providing an affordance indicating that a plurality of editing features can be accessed via the touch block object, displaying icons representing the plurality of editing features in response to receiving a touch-based input to access the plurality of features, the icons displayed as an extension of the touch block object, and providing the editing feature responsive to receiving a selection of an icon. The method 1600 may further involve selectively displaying icons representing editing features based on which editable object is selected on the canvas. In displaying icons, at least some of the icons may be oriented in a non-linear orientation for access by user fingers based on an expected user hand orientation.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
    displaying an editing canvas on a touch screen of an electronic device;
    displaying a touch block object overlaying a portion of the editing canvas, wherein the touch block object blocks unintentional touches in an area of the touch screen associated with the touch block object, wherein an initial position of the touch block object is based on previously received input indicating a dominant user hand, and wherein the touch block object is configured to resize the touch block object and rotate the touch block object, according to respective touch input gestures on the touch block object; and
    changing a position of the touch block object with respect to the editing canvas by translating the touch block object in a direction on the editing canvas responsive to receiving dragging touch input on the touch screen.

2. The method of claim 1 wherein displaying the touch block object comprises:
    displaying the movable touch block object proximate to the portion and in a position determined to block unintended input from a non-dominant user hand resting on the touch screen while the editing is occurring.

3. The method of claim 1 further comprising providing an editing feature for editing content on the canvas, the editing feature provided responsive to receiving input at the touch block object to access the editing feature.

4. The method of claim 1 wherein the area of the touch screen associated with the touch block object comprises one or more of:
    an area overlaid by the touch block object; and
    an additional area determined based at least in part on determining a portion of the canvas in which editing is occurring.

5. The method of claim 1 wherein at least some content underlying the touch block object is visible through the touch block object, wherein at least a portion of the touch block object is translucent or transparent and at least another portion of the touch block object is visible.

6. The method of claim 1 wherein the touch block object comprises a displayed ruler.

7. The method of claim 1 wherein the touch block object comprises an indicator displaying a rotation guide indicating a rotation of a straight edge of the touch block object relative to the canvas.

8. The method of clam 1 where the touch block object comprises a drawing guide facilitating drawing content to the canvas area.

9. The method of claim 8 wherein the drawing guide comprises a straight edge.

10. The method of claim 8 wherein the drawing guide comprises a stencil.

11. The method of claim 1 further comprising providing different responses to finger touch input and stylus touch input respectively at the touch block object.

12. The method of claim 1 further comprising repositioning the touch block object to a not-in-use position at least partially visible at an edge of the touch screen in response to receiving a touch input swipe gesture towards the edge of the touch screen.

13. A computer-implemented method comprising:
    displaying an editing canvas on a touch screen of a touch-based electronic device;
    displaying a touch block object overlaying a portion of the editing canvas, wherein the touch block object blocks unintentional touches in an area of the touch screen associated with the touch block object, wherein an initial position of the touch block object is based on previously received input indicating a dominant user hand, and wherein the touch block object is configured to move the touch block object, resize the touch block object, and rotate the touch block object, according to respective touch input gestures on the touch block object;
    providing an editing feature for editing content on the canvas, the editing feature provided responsive to receiving input, wherein the input is a touch input gesture from a user, at the touch block object to access the editing feature; and
    editing content based on input accessing the editing feature.

14. The method of claim 13 wherein providing the editing feature comprises:
    providing an affordance indicating that a plurality of editing features can be accessed via the touch block object;
    displaying icons representing the plurality of editing features in response to receiving a touch-based input to access the plurality of features, the icons displayed as an extension of the touch block object; and
    providing the editing feature responsive to receiving a selection of an icon.

15. The method of claim 14 further comprising selectively displaying icons representing editing features based on which editable object is selected on the canvas.

16. The method of claim 15 wherein the at least some of the icons are oriented in a non-linear orientation, for access by user fingers based on an expected user hand orientation.

17. A system comprising:
    a touch screen; and
    a processor for executing instructions stored in computer-readable medium on one or more devices providing steps comprising:
    displaying an editing canvas on the touch screen;
    displaying a touch block object overlaying a portion of the editing canvas, wherein the touch block object blocks unintentional touches in an area of the touch screen associated with the touch block object, wherein an initial position of the touch block object is based on previously received input indicating a dominant user, and wherein the touch block object is configured to move the touch block object, resize the touch block object and rotate the touch block object, according to respective touch input gestures on the touch block object; and
    changing a position of the touch block object with respect to the editing canvas by translating the touch block object in a direction on the editing canvas responsive to receiving dragging touch input on the touch screen.

18. A non-transitory computer-readable medium on which is encoded program code, the program code comprising:
   program code for displaying an editing canvas on a touch screen of an electronic device;
   program code for displaying a touch block object overlaying a portion of the editing canvas, wherein the touch block object blocks unintentional touches in an area of the touch screen associated with the touch block object, wherein an initial position of the touch block object is based on previously received input indicating a dominant user hand, and wherein the touch block object is configured to move the touch block object, resize the touch block object and rotate the touch block object, according to respective touch input gestures on the touch block object; and
   program code for changing a position of the touch block object with respect to the editing canvas by translating the touch block object in a direction on the editing canvas responsive to receiving dragging touch input on the touch screen.

19. The method of claim 1, wherein the previously received input indicating a dominant user hand is based on one or more of a selection of an object on the editing canvas by the user, a last edit of the object on the editing canvas by the user, and a location of editing being made on the editing canvas by the user at the time of the displaying of the touch block object.

20. The method of claim 1, wherein changing a position of the touch block object with respect to the editing canvas further comprises:
   repositioning the touch block object automatically in response to a change in display characteristics of the editing canvas.

\* \* \* \* \*